W. GOVAN & P. MORRIS.
APPARATUS FOR USE IN THE PRODUCTION OF MORNING ROLLS.
APPLICATION FILED JUNE 11, 1914.
1,184,342.
Patented May 23, 1916.
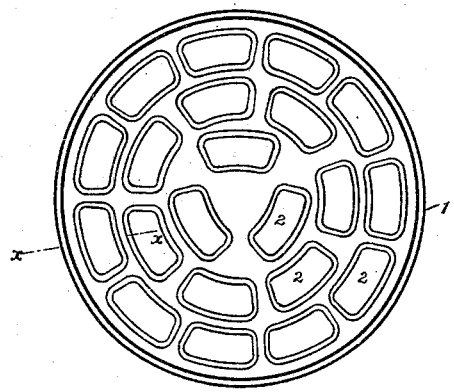
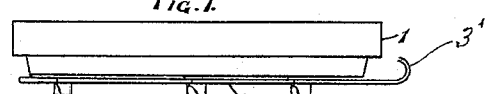
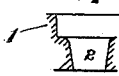
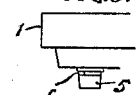
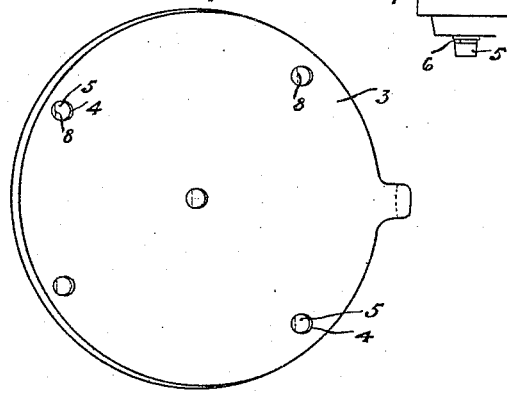
WITNESSES
Frank H Logan
Alfred R. Anderson
INVENTORS
WILLIAM GOVAN AND PETER MORRIS
BY
ATTORNEY
THE COLUMBIA PLANOGRAPH CO., WASHINGTON, D. C.

UNITED STATES PATENT OFFICE.

WILLIAM GOVAN AND PETER MORRIS, OF JOHNSTONE, SCOTLAND.

APPARATUS FOR USE IN THE PRODUCTION OF MORNING ROLLS.

1,184,342. Specification of Letters Patent. Patented May 23, 1916.

Application filed June 11, 1914. Serial No. 844,558.

*To all whom it may concern:*

Be it known that we, WILLIAM GOVAN and PETER MORRIS, subjects of the King of the United Kingdom of Great Britain and Ireland, and residing at Johnstone, county of Renfrew, Scotland, have invented a certain new and useful Improvement in Apparatus for Use in the Production of Morning Rolls, of which the following is a specification.

The subject matter of this invention is a shaping or molding device for use in the production of morning rolls, of the type including a plate formed with a number of substantially equal sized openings coöperating with a separable base piece.

The invention consists in the particular construction hereinafter described and pointed out in the claim.

Apparatus embodying the invention is illustrated in the accompanying drawing in which—

Figure 1 is an elevation, Fig. 2 is a plan view, Fig. 3 is an inverted plan view and Fig. 4 is a section on the line x—x, Fig. 2. Fig. 5 is an elevation of a detail.

Referring to the drawing, 1 denotes the shaping or molding element which is substantially discoid and is formed with a number of countersunk openings 2 of substantially equal dimensions into which pockets the dough previously placed on the upper face of the element 1 is pressed downwardly by any suitable means e. g., by means of a separate vertically movable piston-like member, thus forming blanks of the requisite size and suitable shape for further treatment. Coöperating with the dough-receiving element 1 is a plane detachable base plate 3, imperforate save for the orifices 4 of the configuration shown in Fig. 3, through which orifices 4 are passed pins 5 disposed on the underside of the element 1 and each recessed at 6, as shown in Fig. 5 so as to be engaged by the boundary 8 of the corresponding orifice, thus temporarily connecting the base plate 3 to the element 1.

It will be understood that the dough is pressed into the openings 2, the base plate 3 serving temporarily to close the lower end of each opening; then the base plate is removed, permitting convenient removal of the blanks of dough shaped by being pressed into the openings.

The plate 3 is formed with a projection 3' serving as a handle. When the handle 3' is drawn to the right (Fig. 1) the plate 3 is locked in position by engaging shoulders presented by the recesses 6 in the pins 5. When the handle is displaced to the left, the plate 3 is free to be removed from the element 1, and serves as a tray for supporting the dough and transferring it to the oven without further handling.

We claim:—

A device for the production of morning rolls, comprising, in combination, a molding element formed with a plurality of through openings for receiving dough and provided on its lower face with shouldered projections and a coöperating plane base plate having apertures to register with said projections and movable so as to permit said base plate to be locked to said element and unlocked therefrom said plate provided with a handle and adapted to carry dough pressed through said openings.

In testimony whereof we have signed our names to this specification in the presence of two subscribing witnesses.

WILLIAM GOVAN.
PETER MORRIS.

Witnesses:
 MICHAEL LAUER,
 WILLIE LAUER.

Copies of this patent may be obtained for five cents each, by addressing the "Commissioner of Patents, Washington, D. C."